US012119145B2

(12) United States Patent
Hellesøe

(10) Patent No.: US 12,119,145 B2
(45) Date of Patent: Oct. 15, 2024

(54) POWER CABLE, METHOD FOR PRODUCTION AND USE THEREOF

(71) Applicant: Blue Sea Norway AS, Bergen (NO)

(72) Inventor: Bernt Henrik Hellesøe, Bergen (NO)

(73) Assignee: BLUE SEA NORWAY AS, Bergen (NO)

( * ) Notice: Subject to any disclaimer, the term of this patent is extended or adjusted under 35 U.S.C. 154(b) by 112 days.

(21) Appl. No.: 18/084,220

(22) Filed: Dec. 19, 2022

(65) Prior Publication Data

US 2023/0126536 A1 Apr. 27, 2023

Related U.S. Application Data

(62) Division of application No. 17/439,524, filed as application No. PCT/NO2020/050076 on Mar. 18, 2020, now Pat. No. 11,562,833.

(30) Foreign Application Priority Data

Mar. 18, 2019 (NO) .................................... 20190358

(51) Int. Cl.
*H01B 7/22* (2006.01)
*H01B 3/44* (2006.01)
(Continued)

(52) U.S. Cl.
CPC ............. *H01B 7/223* (2013.01); *H01B 3/441* (2013.01); *H01B 7/14* (2013.01); *H01B 7/204* (2013.01); *H01B 9/027* (2013.01); *H01B 13/141* (2013.01)

(58) Field of Classification Search
CPC .......... H01B 7/14; H01B 7/223; H01B 7/204; H01B 7/1825; H01B 3/441; H01B 9/027; H01B 9/00; H01B 13/141; H01B 13/144
See application file for complete search history.

(56) References Cited

U.S. PATENT DOCUMENTS 4,079,190 A 3/1978 Jones
4,275,262 A 6/1981 Sellars
(Continued)

FOREIGN PATENT DOCUMENTS

CN 202258511 5/2012
CN 103093875 5/2013
(Continued)

OTHER PUBLICATIONS

AU Examination Report No. 1 mailed in corresponding AU 2020240976 on Nov. 2, 2021 (5 pages).
(Continued)

*Primary Examiner* — Hoa C Nguyen
*Assistant Examiner* — Amol H Patel
(74) *Attorney, Agent, or Firm* — Wissing Miller LLP

(57) ABSTRACT

The present invention concerns a power cable, comprising a tension member (1), placed in the centre of said power cable; a first insulation layer (3), the tension member (1) being embedded in the first insulation layer (3); and an outer protective sheath (9); wherein said power cable further comprises one or more first aluminum conductors (4), embedded within the first insulation layer (3). The present invention also concerns a process for producing the inventive power cable, the process comprising the step of extruding a first polymeric insulation layer (3) onto the tension member (1) and the one or more conductors (4) in one single step. Finally, the present invention concerns the use of the inventive power cable, in medium-voltage to high-voltage subsea applications, such as an offshore windmill cable infrastructure or driving of subsea pumps.

27 Claims, 4 Drawing Sheets

(51) Int. Cl.

| | |
|---|---|
| ***H01B 7/14*** | (2006.01) |
| ***H01B 7/18*** | (2006.01) |
| ***H01B 7/20*** | (2006.01) |
| ***H01B 9/00*** | (2006.01) |
| ***H01B 9/02*** | (2006.01) |
| ***H01B 13/14*** | (2006.01) |

(56) References Cited

U.S. PATENT DOCUMENTS

| | | | | |
|---|---|---|---|---|
| 4,275,272 | A | 6/1981 | Sellars | |
| 2007/0237469 | A1 | 10/2007 | Olsen | |
| 2011/0048765 | A1 | 3/2011 | Eggertsen | |
| 2012/0168199 | A1 | 7/2012 | McCullough | |
| 2012/0234596 | A1 | 9/2012 | Lund | |
| 2013/0253128 | A1 | 9/2013 | Cho | |
| 2015/0340125 | A1* | 11/2015 | Huang | A47C 21/048 219/211 |
| 2016/0055943 | A1 | 2/2016 | Spalding | |
| 2016/0377825 | A1 | 12/2016 | Bringuier | |
| 2017/0051136 | A1* | 2/2017 | Kohri | C09K 21/02 |
| 2020/0243218 | A1* | 7/2020 | Goertzen | H01B 7/046 |
| 2020/0270449 | A1* | 8/2020 | Tran | H01B 3/28 |
| 2021/0210252 | A1* | 7/2021 | Varkey | H01B 1/20 |

FOREIGN PATENT DOCUMENTS

| | | |
|---|---|---|
| CN | 205230639 | 5/2016 |
| CN | 109192372 | 1/2019 |
| EP | 2367177 | 9/2011 |
| GB | 1579123 | 11/1980 |
| GB | 2101798 | 1/1983 |
| JP | S6032205 | 2/1985 |
| KR | 200177486 | 4/2000 |
| KR | 20070100166 | 10/2007 |
| KR | 20110023838 | 3/2011 |
| KR | 20110135173 | 12/2011 |
| KR | 20120046745 | 5/2012 |
| KR | 101687794 | 12/2016 |
| NO | 320590 | 2/2005 |
| RU | 2618674 | 5/2017 |
| WO | 2012150286 | 11/2012 |
| WO | 2014112682 | 7/2014 |
| WO | 2015005857 | 1/2015 |
| WO | 2017084709 | 5/2017 |

OTHER PUBLICATIONS

KR Office action mailed in KR 10-2021-7033165 on Dec. 30, 2021 (3 pages.).

CN Office Action mailed in CN 082122527 on Jan. 31, 2022 (5 pages).

CN First Search Report mailed in CN 082122527 on Sep. 18, 2021 (2 pages) (Chinese only).

Russian Offfice Action mailed in corresponding RU 2021129612 on Feb. 8, 2022 (15 pages).

Search Report and Written Opinion mailed in SG Application No. 11202110133W on Apr. 20, 2022. (9 pages).

Notice of Reasons for Refusal mailed in JP Application No. 2021-568849 on Apr. 26, 2022 (3 pages).

International Search Report and Written Opinion mailed in corresponding PCT/NO2020/050076 on Jul. 10, 2020 (7 pages).

Norwegian Search Report mailed in NO 20190358 on Jun. 3, 2019 (2 pages).

* cited by examiner

POWER CABLE, METHOD FOR PRODUCTION AND USE THEREOF

CROSS-REFERENCE TO RELATED APPLICATIONS

This application is a divisional of U.S. application Ser. No. 17/439,524 filed Sep. 15, 2021, which is a 371 of PCT/NO2020/050076 filed on Mar. 18, 2020, published on Sep. 24, 2020 under publication number WO 2020/190149, which claims priority benefits from Norwegian Patent Application No. 20190358 filed Mar. 18, 2019, the disclosure of each is incorporated herein in its entirety by reference.

TECHNICAL FIELD

The present application relates to power cables, their method of production and their use in subsea applications.

BACKGROUND

Over the last decades, unexpected breakdowns of subsea high-voltage (HV) power cables have increased. In most cases such breakdowns seem to be caused by the use of crosslinked polyethylene (PEX), a high-complexity material. PEX was first introduced as a HV cable manufacturing material in response to a change in design requirements for onshore cables, accommodating conductor operating temperatures up to 90° C., instead of temperatures up to 70° C. This temperature requirement seems to be irrelevant in the generally cold subsea ocean environments, where ambient temperatures hardly reach more than a few degrees above 0° C.

From a materials perspective, there is no reason why non-crosslinked polymers such as ethylene, polyethylene and ethylene propene rubber cannot be used in HV cables operating up to 66 kilo Volt, especially when conductor electric field stresses are maintained at a reduced level. However, in order to reduce electric field stresses in HV cables to an acceptable level, the outer diameter of the conductor must be increased, which, in turn, increases the costs of the external cable armoring to prohibitive levels and comes at a severe weight penalty, while further reducing the ease of handling of the HV cable.

SUMMARY OF THE INVENTION

The present invention concerns a power cable, comprising a tension member, placed in the centre of said power cable; a first insulation layer, the tension member being embedded in the first insulation layer; and an outer protective sheath; wherein said power cable further comprises one or more first aluminum conductors, embedded within the first insulation layer.

The present invention also concerns a process for producing the inventive power cable, the process comprising the step of extruding a first polymeric insulation layer onto the tension member and the one or more conductors in one single step.

Finally, the present invention concerns the use of the inventive power cable, in medium-voltage to high-voltage subsea applications, such as an offshore windmill cable infrastructure or driving of subsea pumps.

The present invention utilizes aluminum based conductors, which demand an increased conductor diameter compared to conventional copper based conductors. Furthermore, the present invention replaces the conventional outer armoring with an internal tension member placed in the center of the power cable. By utilizing an internal tension member, the outer diameter of the conductor is further increased, in that it is now radially extended to accommodate the tension member. With this set-up, the electrical field stress is significantly decreased, as compared to conventional power cables and the expensive external armoring can safely be omitted. Furthermore, because of the reduced electrical field stress, insulation thickness can be reduced and a solid, non-crosslinked ethylene, polyethylene or ethylene propene rubber material may be used as an insulator, thereby replacing PEX and solving the aforementioned problems.

A further advantage of providing an internal tension member and omitting the conventional external armor, is that the overall cable diameter, the overall cable weight and the cable bending stiffness are reduced. The low specific gravity of the power cable according to the present invention, when submerged in water, as well as its decreased stiffness, allow for low clamping forces and improved handling when installing the power cable, such as during caterpillar installation. The power cable according to the invention is therefore more flexible than conventional cables and consequently, easier to strap.

Finally, omitting the conventional external armor results in a significant cost reduction, as external armor typically comprises 40% of the total materials cost of a power cable.

A further advantage of the power cable according to the invention is that the aluminum conductor renders semiconductor insulation unnecessary, thereby reducing the number of elements required to form the power cable, as well as reducing the overall diameter of the power cable itself.

Finally, the solid insulation material renders the power cable unusually crush resistant, as compared to conventional power cables. The solid design and the consequent lack of any voids, such as present in PEX foam, ensures that the power cable according to the invention is of the so-called super dry design. A super dry design implies a true dry construction, in which there is no potential risk for voids present in the cable material to fill up with water at any one point in the service lifetime of the cable.

FIGURES

Figure 4A:
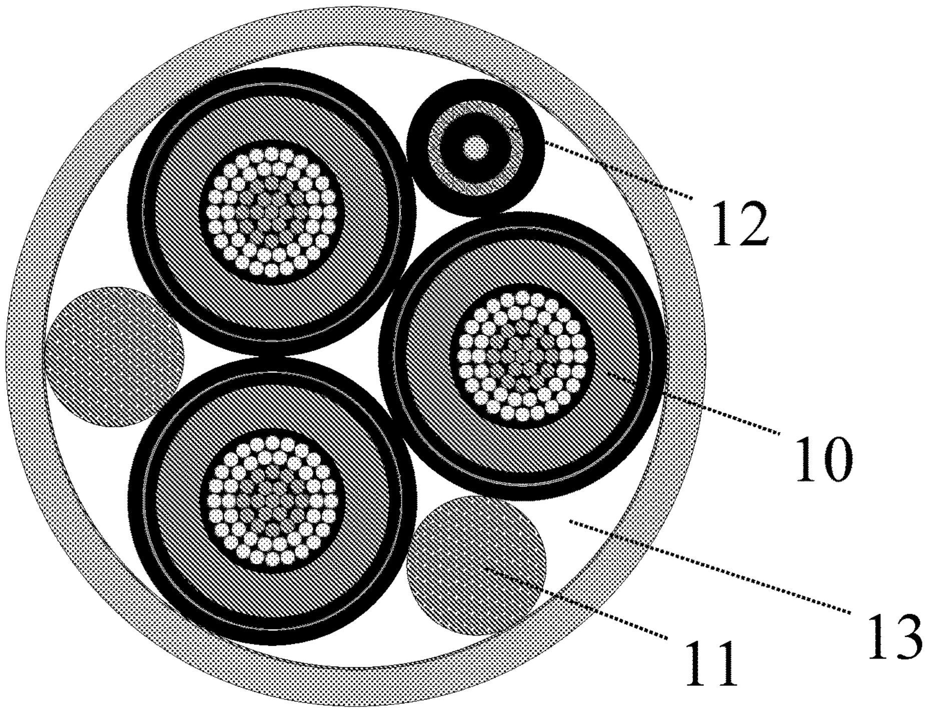
Figure 4B:
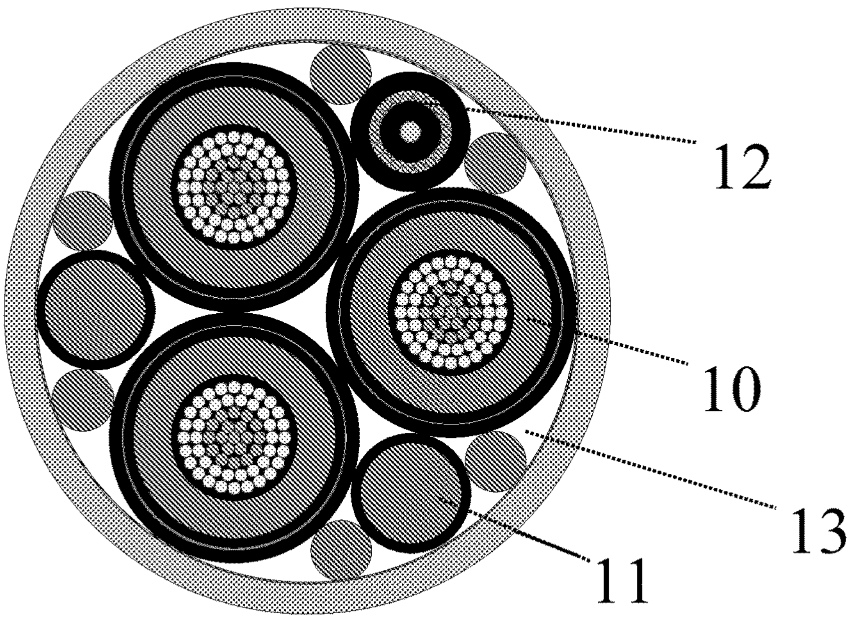

FIGS. 4A and B show two multi-core power cable configurations.

DETAILED DESCRIPTION

Figure 1:
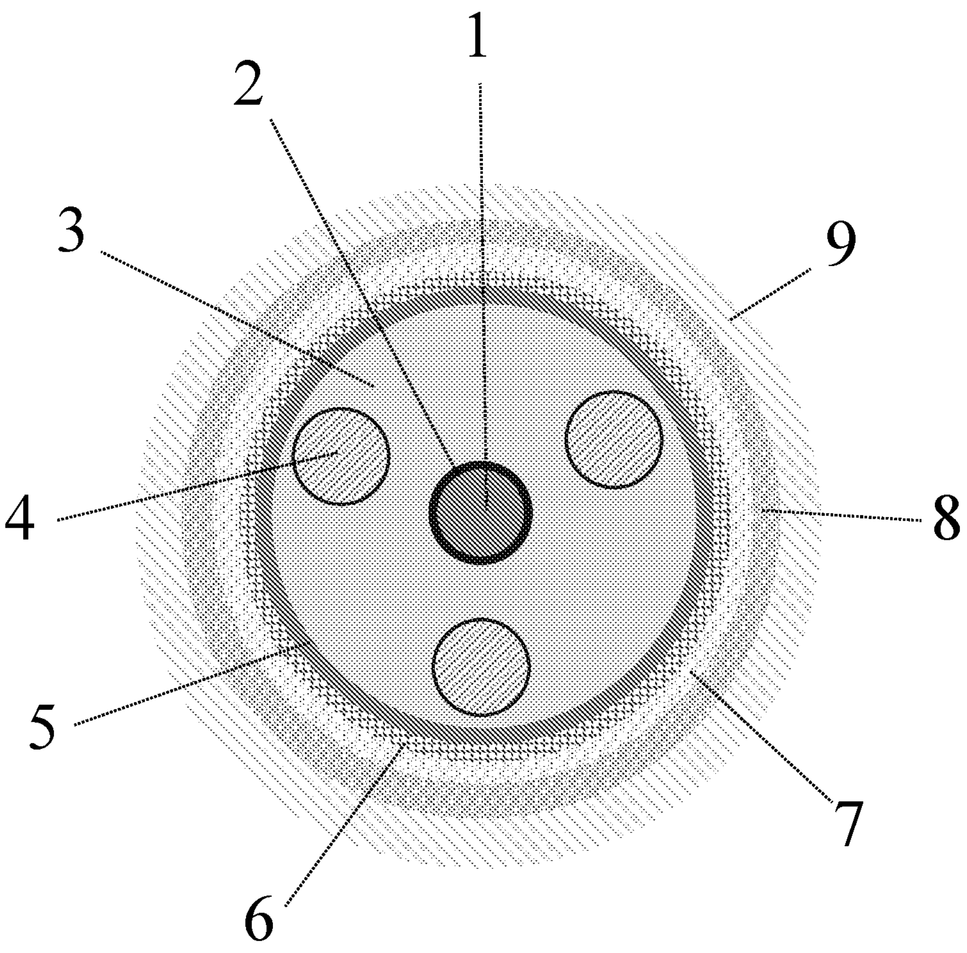
FIG. 1 is a schematic cross-section of a power cable according to a first embodiment of the invention.

FIG. 1 is a schematic cross-section of a power cable according to a first embodiment of the invention. The power cable comprises a tension member 1, placed in the centre of said power cable, a first insulation layer 3 surrounding the tension member 1, and is protected from the environment by an outer sheath 9.

Embedded within the first insulation layer 3 are one or more, preferably three, first aluminum conductors 4. Each first aluminum conductor may have a circular cross-section, where the diameter is the same for each conductor. The conductor diameter may be chosen according to the desired application for the power cable.

Furthermore, the power cable may comprise a first semi-conducting outer screen 2 surrounding the tension member 1, and a second semi-conducting outer screen 5, surrounding the insulation layer 3. The power cable may optionally comprise a first metallic screen 6 and/or a second metallic screen 7, wherein the first and/or second metallic screens may have various functions, such as facilitating failure search. The first and/or second metallic screens are wrapped by a semi-conductive tape wrapping 8.

For a power cable with a circular cross-section and two or more first aluminum conductors 4, the conductors are preferably arranged in a circumferentially equidistant manner. This is shown in FIG. 1 for an embodiment with three conductors. In medium-voltage (up to 1 kV) to high-voltage (above 1 kV) applications, three or more phases are usually required; the power cable comprises a corresponding number of conductors.

Typical mechanical properties for an exemplary power cable according to the first embodiment are provided in Table 1.

TABLE 1

| Parameter | Value | Unit |
|---|---|---|
| Outer Diameter | 90.3 | [mm] |
| Mass Empty | 7.6 | [kg/m] |
| Mass Filled | 7.6 | [kg/m] |
| Mass Filled And Flooded | 7.6 | [kg/m] |
| Submerged Weight Empty | 1.1 | [kgf/m] |
| Submerged Weight Filled | 1.1 | [kgf/m] |
| Submerged Weight Filled And Flooded | 1.1 | [kgf/m] |
| Specific Weight Ratio | 1.2 | [—] |
| Subm. Weight Dia. Ratio | 11.7 | [kgf/m^2] |
| Axial Stiffness | 69.7 | [MN] |
| Bending Stiffness | 2.5 | [kNm^2] |
| Bending Stiffness (friction free) | 2.3 | [kNm^2] |
| Torsion Stiffness | 1.9 | [kNm^2] |
| Tension/Torsion Factor | −0.05 | [deg/m/kN] |

Figure 2:
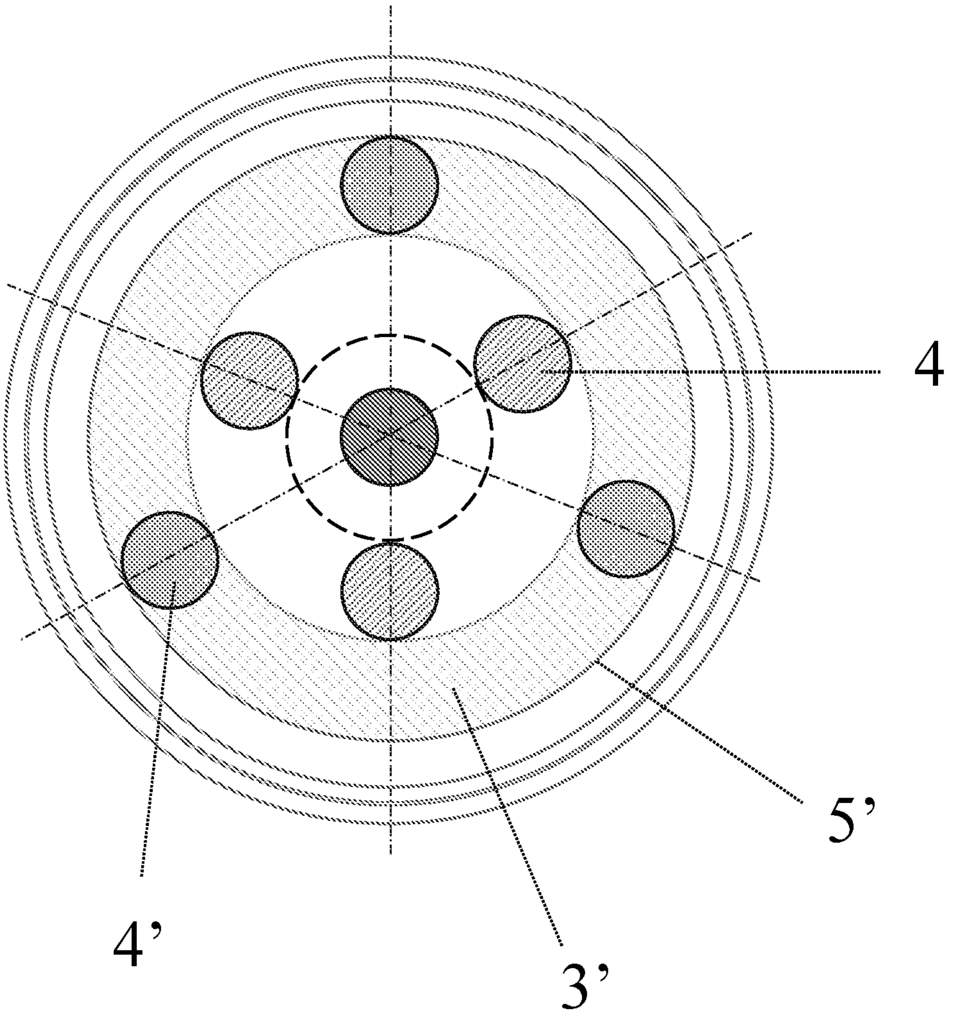
FIG. 2 is a schematic cross-section of a power cable according to a second embodiment of the invention.

FIG. 2 is a schematic representation of a power cable cross-section according to a second embodiment of the invention. Features corresponding to the first embodiment are designated by the same reference signs. The second embodiment differs from the first embodiment in that additionally a second insulation layer 3', preferably surrounded by a third semi-conducting outer screen 5', is provided. Said second insulation layer 3' surrounds the first insulation layer 3 and, if present, the second semi-conducting outer screen 5. Embedded within the second insulation layer 3' are one or more second aluminum conductors 4'. Each second aluminum conductor may have a circular cross-section, the diameters of the first aluminum conductors 4 and the second aluminum conductors 4' preferably being the same.

For a power cable with a circular cross-section and two or more second aluminum conductors 4', the conductors are preferably arranged in a circumferentially equidistant manner. This is shown in FIG. 2 for an embodiment with three conductors.

FIG. 2 displays a power cable comprising three first and three second aluminum conductors 4, 4', configured such that the mid-point of each one first aluminum conductor 4 lies on a straight line through the mid-point of the power cable and the mid-point of exactly one second aluminum conductor 4'. The configuration of FIG. 2 may instead comprise two, four or more first and second aluminum conductors. This configuration allows the power cable to be utilized in operating two medium-voltage to high-voltage applications simultaneously. For example, when the power cable is utilized in an AC application, two subsea pumps may be operated at the same time, each provided with power by its own set of aluminum conductors 4 and 4'. Alternatively, when the power cable is used as a DC export cable, the three first aluminum conductors 4 may function as a DC conductor phase, whereas the three second aluminum conductors 4' may function as earth lines. The latter use is of specific relevance for export of power from sea-based windmills.

The tension member 1 comprises a high-tensile material, such as steel, preferably high-tensile steel, a composite material or an aramid (Kevlar) material. Furthermore, the tension member 1 may be solid, e.g., in the form of a rod, a wire or a wire-bundle. Alternatively, the tension member may be hollow, e.g., in the form of a tube. The tension member 1 may comprise a further element, such as a temperature sensor, located in its center.

Figure 3:
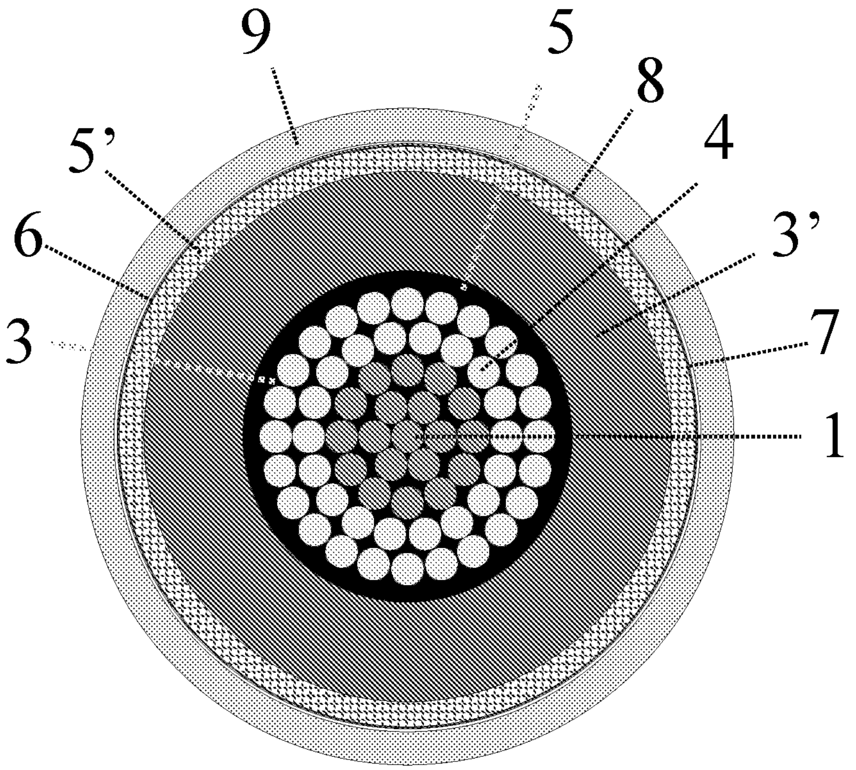
FIG. 3 is a schematic cross-section of a power cable according to a third embodiment of the invention.

A schematic cross-section of a power cable according to a third embodiment of the invention is shown in FIG. 3. In this embodiment, a tension member 1 in the form of a wire-bundle is surrounded by one or more first aluminum conductors 4, in the form of one or more rings of wires, both of which are embedded in the first insulation layer 3. A second insulation layer 5 is provided, separated from the first insulation layer 3 by a first semi-conductive outer sheet 2.

One or more power cables according to the third embodiment may bundled into a multi-core power cable, variations of which are shown in FIGS. 4A and B. A multi-core power cable may comprise one or more power cables 10 according to the third embodiment, optionally one or more weight elements 11 and optionally a further functional element 12. The functional element may comprise, e.g., a fiber-optic cable or a signal cable. The weight elements 11 may comprise zinc or lead. The one or more power cables 10, weight elements 11 and functional element 12 are embedded in an extruded insulation layer 13. An outer semi-conductive screen is provided, surrounding the insulation layer 13. The multi-core power cable is protected from the environment by an outer sheath, surrounding the outer semi-conductive screen.

FIGS. 4A and B show a configuration with three power cables 10 and one further functional element 12. In FIG. 4A two weight elements 11 are provided, in FIG. 4C a large number of weight elements 11 are provided.

Typical mechanical properties for an exemplary power cable according to the embodiment of FIG. 4A are provided in Table 2; the various cable mass, submerged weight, specific weight ratio and stiffness values listed in Table 1 may, naturally be varied depending on the amount and type of weight elements present.

TABLE 2

| Parameter | Value | Unit |
|---|---|---|
| Outer Diameter | 96.1 | [mm] |
| Mass Empty | 14.3 | [kg/m] |
| Mass Filled | 14.3 | [kg/m] |
| Mass Filled And Flooded | 15.1 | [kg/m] |
| Submerged Weight Empty | 6.8 | [kgf/m] |
| Submerged Weight Filled | 6.9 | [kgf/m] |
| Submerged Weight Filled And Flooded | 7.7 | [kgf/m] |
| Specific Weight Ratio | 2.0 | [—] |
| Subm. Weight Dia. Ratio | 79.7 | [kgf/m^2] |
| Axial Stiffness | 150.3 | [MN] |

TABLE 2-continued

| Parameter | Value | Unit |
|---|---|---|
| Bending Stiffness | 3.4 | [kNm^2] |
| Bending Stiffness (friction free) | 2.3 | [kNm^2] |
| Torsion Stiffness | 4.5 | [kNm^2] |
| Tension/Torsion Factor | −0.09 | [deg/m/kN] |

A process for producing the power cable according to the invention, comprises the step of extruding the first insulation layer 3 onto the tension member 1 and the one or more first aluminum conductors 4. Consequently, the tension member 1 and the one or more first aluminum conductors 4 become embedded within the first insulation layer 3. Furthermore, all of the one or more second aluminum conductors 4' are embedded within the second insulation layer 3. In order to produce a power cable according to the second embodiment, the second insulation layer 3' is extruded onto the one or more second aluminum conductors 4' in a further process step. The first and second process steps may be executed in sequence, extruding the second insulation layer 3' onto an already extruded first insulation layer 3, or simultaneously, by means of a co-extrusion.

The process according to the invention is contrary to production methods for conventional power cables, where each conductor is first embedded within its own insulation layer, upon which the desired number of thus insulated conductors are bundled together and held in place by a separate outer layer. Consequently, the process according to the present invention achieves considerable cost-savings and is much simpler to implement as compared to conventional power cable production processes.

The first, second and third semi-conducting outer screens 2, 5, 5' comprise a polymer, preferably polyethylene, polystyrene or polyamide.

The first and second insulation layers 3, 3' comprise a non-crosslinked polymer, preferably ethylene, polyethylene or ethylene propene rubber.

The optional first and second metallic screens 6, 7 comprise copper, preferably annealed copper, or lead. The metallic screens are preferably provided in the form of a tape or sheath. The semi-conductive tape wrapping 8 comprises a polyamide (nylon). Finally, the outer sheath 9 comprises a high-density polyethylene, which may have been extruded onto the underlying layers or may have been wrapped, in the form of a tape, around the underlying layers.

Although the power cable in FIGS. 1, 2 and 3 is presented as having a circular cross-section, this is merely for illustrative purposes and by no means limiting; other cross-section geometries could be used, such as elliptical or rectangular.

The power cable according to the invention may further be provided with a lead jacket, surrounding the outer sheath. Such a lead jacket adds weight, which may be desirable for subsea applications. Furthermore, the lead jacket increases the service life expectancy of the power cable considerably, up to 50 years.

The foregoing embodiments and examples are by no means limiting, the scope of the invention being defined by the appended claims.

The invention claimed is:

1. A process for producing a power cable comprising extruding a first insulation layer onto at least one tension member and one or more first electrical conductors in a single step such that the at least one tension member is positioned in proximity to a center of the first insulation layer and surrounded by and in contact with the first insulation layer, and such that the one or more first electrical conductors are spaced from the tension member and surrounded by and in contact with the first insulation layer.

2. The process for producing a power cable according to claim 1, further comprising extruding an outer sheath onto the first insulation layer.

3. The process for producing a power cable according to claim 1, further comprising wrapping an outer sheath around the first insulation layer.

4. The process for producing a power cable according to claim 1, wherein the one or more first electrical conductors comprise aluminum conductors.

5. The process for producing a power cable according to claim 1, wherein the at least one tension member is made of a high-tensile material.

6. The process for producing a power cable according to claim 1, wherein the at least one tension member is made of one of steel, a composite material and an aramid material.

7. The process for producing a power cable according to claim 1, wherein the first insulation layer is made of a non-cross-linked solid polymer or a non-cross-linked solid ethylene propene rubber.

8. The process for producing a power cable according to claim 1, further comprising extruding a second insulation layer onto the first insulation layer and one or more second electrical conductors.

9. The process for producing a power cable according to claim 8, wherein the one or more second electrical conductors comprise aluminum conductors.

10. The process for producing a power cable according to claim 8, wherein the second insulation layer is co-extruded with the first insulation layer, or the first insulation layer and the second insulation layer are extruded sequentially.

11. The process for producing a power cable according to claim 8, wherein the second insulation layer is made of a non-cross-linked solid polymer or a non-cross-linked solid ethylene propene rubber.

12. A process for producing a power cable comprising:

extruding a first insulation layer onto at least one tension member and one or more first electrical conductors in a single step such that the at least one tension member is positioned in proximity to a center of the first insulation layer and surrounded by and in contact with the first insulation layer, and such that the one or more first electrical conductors are spaced from the tension member and surrounded by and in contact with the first insulation layer; and extruding a second insulation layer onto the first insulation layer and one or more second electrical conductors.

13. The process for producing a power cable according to claim 12, wherein the one or more first electrical conductors and the one or more second electrical conductors comprise aluminum conductors.

14. The process for producing a power cable according to claim 12, wherein the at least one tension member is made of a high-tensile material.

15. The process for producing a power cable according to claim 12, wherein the at least one tension member is made of one of steel, a composite material and an aramid material.

16. The process for producing a power cable according to claim 12, wherein the first insulation layer and/or the second insulation layer is made of a non-cross-linked solid polymer or a non-cross-linked solid ethylene propene rubber.

17. The process for producing a power cable according to claim 12, wherein the second insulation layer is co-extruded with the first insulation layer, or the first insulation layer and the second insulation layer are extruded sequentially.

18. A process for producing a multi-core power cable comprising:

producing at least one power cable by extruding a first insulation layer onto at least one tension member and one or more first electrical conductors in a single step such that the at least one tension member is positioned in proximity to a center of the first insulation layer and surrounded by and in contact with the first insulation layer, and such that the one or more first electrical conductors are spaced from the tension member and surrounded by and in contact with the first insulation layer; and extruding a second insulation layer onto the at least one power cable, at least one weight elements and at least one functional element.

19. The process for producing a multi-core power cable according to claim 18, further comprising wrapping a semiconductive screen around the second insulation layer.

20. The process for producing a multi-core power cable according to claim 18, wherein the one or more first electrical conductors comprise aluminum conductors.

21. The process for producing a power cable according to claim 18, wherein the at least one tension member is made of a high-tensile material.

22. The process for producing a power cable according to claim 18, wherein the at least one tension member is made of one of steel, a composite material and an aramid material.

23. The process for producing a power cable according to claim 18, wherein the first insulation layer and/or the second insulation layer is made of a non-cross-linked solid polymer or a non-cross-linked solid ethylene propene rubber.

24. The process for producing a multi-core power cable according to claim 18, wherein the step of producing at least one power cable further comprises extruding a third insulation layer onto the first insulation layer and one or more second electrical conductors.

25. The process for producing a multi-core power cable according to claim 24, wherein the third insulation layer is co-extruded with the first insulation layer, or the first insulation layer and the third insulation layer are extruded sequentially.

26. The process for producing a multi-core power cable according to claim 24, wherein the one or more second electrical conductors comprise aluminum conductors.

27. The process for producing a power cable according to claim 24, wherein the first insulation layer and/or the third insulation layer is made of a non-cross-linked solid polymer or a non-cross-linked solid ethylene propene rubber.

* * * * *